2,922,787

MONO-, DI-, AND TRISUBSTITUTED OROTIC ACIDS AND DERIVATIVES

Edgar A. Ferguson, Jr., Brooklyn, N.Y.

No Drawing. Application January 30, 1957
Serial No. 637,073

8 Claims. (Cl. 260—256.4)

The present invention relates to substitution products of orotic acid. More particularly this invention relates to substitution products of orotic acid and dihydro orotic acid. With further particularity this invention relates to both mono-, and disubstituted orotic and dihydro orotic acids, to 5,5'-disubstituted and dihydro orotic acids, 5-mono substituted dihydro orotic and orotic acids, and the 4 chloro and 4 hydroxy derivatives of orotic and dihydro orotic acids. These products are medicinally useful in the field of sedation and spasmolitic agents.

Orotic acid is represented by the following structural formula:

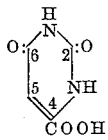

In the manufacture of disubstituted derivatives it is sometimes convenient to utilize dihydro orotic acid. Dihydroorotic acid has the folowing structural formula:

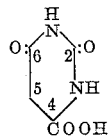

It should be noted that the general structural formula for dihydro orotic acid has been given. This includes the levarotary, the dextrarotary, and racemic forms. The enantiomorphic forms may be delineated. This optical isomerism is based upon the position of the 4 carbon in the ring since this 4 carbon is attached to 4 different radicals being H, COOH, NH, and $CH_2$. The products of this invention being the organo substituted orotic acid, dihydro orotic acid, hydro orotic acid, 4-halo orotic acid, and 4-hydroxy orotic acids, may be prepared conveniently in some cases by using dihydro orotic acid as the starting material. However, other methods not utilizing dihydro orotic acid may also be used.

It should be noted that in connection with these enantiomorphic forms that the L-form is apparently a metabolite. This levarotary form is one of the forms which is caused by the asymmetric carbon atom C in position 4. The number of optically active isomers being $2^n$ when $n$ is the number of asymmetric carbon atoms: therefore in this case it is $2^1$ equalling two forms. Therefore there is an optically neutral form (d,l) or the racemic form and the dextrarotary and levarotary forms. Since this is not used as a metabolite the L-form is not the only acetive form, although there may be differences between the forms. Whichever of the optically active forms is used as a starting material the final substance will have the same optical properties since the processes described do not distort the molecule optically. There may be a difference however between the degree of activity of the various enantiomorphic forms. This applies to the method of making dihydro orotic acid. The method is to take d, dl, or l form of carbethoxy asparagine. This is made by reacting asparagine with ethochloroformate. Ethochloroformate is made by reacting phosgene with 1 mol of ethyl alcohol. The resultant product of the reaction between asparagine and ethochloroformate with sodium ethylate and refluxed until the sodium dihydro orotic acid is made. It is sometimes convenient to use the sodium salt of dihydro orotic acid. In the sodium salt the sodium is connected to the carboxyl group.

As an explanation and for better understanding of the methods of forming the 5,5'-disubstituents of the dihydro orotic acid, and not as a limiting factor, the following theory of the formation of the said 5,5'-disubstituents is presented. When a methylene group is situated between two carbonyl groups or between a carbonyl and the alpha carbon of a CH—COOH group, as in dihydro orotic acid, the methylene group in the 5,5'-position has extremely labile hydrogens. The carbonyl group in the 6 position of dihydro orotic acid and the CH—COOH group in the 4 position of dihydro orotic acid are both strongly electro negative and this electro negative property is increased by attachment to the NH groups in the 3 position and the 1 position of the dihydro orotic acid, which NH groups in themselves are electro negative. Therefore the hydrogens of the methylene group in position 5 have electrons withdrawn from them so that these H atoms are somewhat labile (H atoms) and are therefore acidic in character. Because these hydrogens on the carbon in the 5 position have an acidic character, it is possible for them to react with the sodium salt of a weaker acid such as sodium ethylate. When these hydrogen atoms on the 5-position of dihydro orotic acid react with the sodium salt of a weaker acid such as sodium ethylate the 5,5'-disodium derivative or orotic acid is formed and the hydrogen is taken up by the acidic radical in this case ethylate, forming the hydrogen compound of the weakly acidic radical. In the case of the reaction with sodium ethylate ethyl alcohol is formed. Thus the 5,5'-disodium orotic acid is formed. At this point any alkyl halide, aryl halide, cyclic halide, hetero-cyclic halide, or an organic halide of specific character such as nicotinyl chloride may be caused to react with the sodium salt of dihydro orotic acid to form sodium chloride and the disubstituted alkyl, aryl, cyclic, or heterocyclic derivative of dihydro orotic acid. It is also to be noted that the alpha carbon atom on the C—COOH group has an H atom attached thereto. This hydrogen atom also has electrons withdrawn from it due to the electro-negativity of the C—COOH group and due to the fact that the said carbon atom in position 4 in the ring is also attached to an NH group which is of itself electro-negative and therefore increases the electro-negativity of the alpha carbon atom at position 4, this hydrogen atom is also somewhat labile and therefore has an acidic character. Under certain reaction conditions therefore it is possible for this hydrogen radical to react with the sodium salt of a weaker acid. Such a compound may be sodium ethylate. Following the same reaction outlined above the 4-sodium position of orotic acid may be obtained and is obtained as a 5,5', 4-trisodium dihydro orotic acid. This 4-sodium position also reacts with an alkyl, aryl, cyclic, or heterocyclic halide in order to form the 4-substituted dihydro orotic acid which may, in addition, have other substituted positions present.

A further, though not limiting explanation of the theory of the chemical reactions involved in the production of this product and which theory is given in common with the above theory by way of more clearly enunciating the character of the chemical reaction here involved and not in any way intended to limit or inhibit the scope of the specifications or the claims hereto appended follows: It is possible to begin the reaction with orotic acid rather than dihydro orotic acid. When this is done the double bond which connects the carbon in position 4 with the carbon in position 5 is treated with hypochlorous acid (ClOH). When this treatment of orotic acid is completed the 4-position carbon atom will be attached to an OH group and a COOH group, there will be but a single bond between carbon in the 4-position and carbon in the 5-position, and carbon in the 5-position will be attached to a hydrogen and a chlorine atom. This chlorine atom will react with the sodium salt of an alkyl, aryl, cyclic, or heterocyclic compound such as sodium ethylate to attach the alkyl, aryl, cyclic, or heterocyclic radical to one of the substituent positions of the 5-carbon atom. The other substituent on the said 5-carbon position may be treated in a manner analogous to that described above for dihydro orotic acid. In this case, however, the end product is the 5-5'-disubstituted 4-hydroxy orotic acid. In addition, hydrobromic acid may be used in the same manner as hypochlorous acid indicated in the preceding discussion and the end product will be the 5,5'-disubstituted 4-bromo orotic acid. It is further possible to react the 5,5'-disubstituted 4-bromo orotic acid with zinc amalgam and acid to form the 5,5'-disubstituted, 4-hydro orotic acid.

In each case it is simpler to work with the sodium salt of orotic acid. By sodium salt is meant the salt of orotic acid in which sodium replaces the H in the COOH group. Naturally any of the reaction products can be converted from the sodium salt form to the acid form by neutralizing with HCl.

For the purpose of expanding the description and definition of the product here invented the following examples are given, not by way of limitation, but for the purposes of further illustration. It will be apparent to one skilled in the art that there are further and other methods of preparation for the product of the invention.

Example 1

To 68 grams of sodium ethylate add 178 grams of sodium dihydro orotic acid. Warm to 78° C. for a period of 1 hour under reflux conditions. Cool. Add 109 grams of ethyl bromide to the reaction product. Filter to remove precipitated sodium bromide. Distill filtrate to remove ethyl alcohol under partial vacuum. The distillate is ethyl alcohol and the residue which may be dried is 5-ethyl, 4,5'-dihydro orotic acid, sodium.

Example 2

To 136 grams of sodium ethylate add 178 grams of sodium dihydro orotic acid. Warm to 78° C. for a period of one hour under reflux conditions. Cool. Add 218 grams of ethyl bromide to the reaction product. Filter to remove precipitated sodium bromide. Distill filtrate to remove ethyl alcohol under partial vacuum. The distillate is ethyl alcohol and the residue which may be dried is 5,5'-diethyl-4-hydro orotic acid, sodium.

Example 3

To 204 grams of sodium ethylate add 178 grams of sodium dihydro orotic acid. Warm to 78° C. for a period of 1 hour under reflux conditions. Cool. Add 318 grams of ethyl bromide to the reaction product. Filter to remove precipitated sodium bromide. Distill filtrate to remove ethyl alcohol under partial vacuum. The distillate is ethyl alcohol and the residue which may be dried is 4,5,5'-triethyl orotic acid, sodium.

Example 4

To 178 grams of sodium salt of dihydro orotic acid add 68 grams of sodium ethylate. This is refluxed at a temperature of 78° C. for 1 hour. Cool. Add 156 grams of ethyl iodide. Reflux for 1 hour at 78° C. Filter to separate the residue of sodium iodide. Extract the alcohol under partial vacuum. The product of this reaction is 5-ethyl, 4,5-dihydro orotic acid, sodium.

Example 5

To 178 grams of sodium salt of dihydro orotic acid add 136 grams of sodium ethylate. This is refluxed at a temperature of 78° C. for 1 hour. Cool. Add 312 grams of ethyl iodide. Reflux for 1 hour at 78° C. Filter to separate the residue of sodium iodide. Extract the alcohol under partial vacuum. The product of this reaction is 5,5'-diethyl, 4-hydro orotic acid, sodium.

Example 6

To 178 grams of sodium salt of dihydro orotic acid add 204 grams of sodium ethylate. This is refluxed at a temperature of 78° C. for 1 hour. Cool. Add 468 grams of ethyl iodide. Reflux for 1 hour at 78° C. Filter to separate the residue of sodium iodide. Extract the alcohol under partial vacuum. The product of this reaction is 4,5,5'-triethyl orotic acid, sodium.

Example 7

To 68 grams of sodium ethylate add 178 grams of sodium salt of dihydro orotic acid. Reflux at 78° C. for 1 hour. Cool. Add 112 grams of chloro benzene. Filter to separate sodium chloride. Extract alcohol from the filtrate under partial vacuum. The residue may be dried. The residue is 5,5'-phenyl dihydro orotic acid, sodium.

Example 8

To 134 grams of sodium ethylate add 178 grams of sodium salt of dihydro orotic acid. Reflux at 78° C. for 1 hour. Cool. Add 224 grams of chlorobenzene. Filter to separate sodium chloride. Extract alcohol from the filtrate under partial vacuum. The residue may be dried. The residue is 5,5'-diphenyl 4-hydro orotic acid, sodium.

Example 9

To 196 grams of sodium ethylate add 178 grams of sodium salt of dihydro orotic acid. Reflux at 78° C. for 1 hour. Cool. Add 336 grams of chloro benzene. Filter to separate sodium chloride. Extract alcohol from the filtrate under partial vacuum. The residue may be dried. The residue is 4,5,5'-triphenyl orotic acid, sodium.

Example 10

Add 178 grams of the sodium salt of dihydro orotic acid to 136 grams of sodium ethylate. Heat at a temperature of 78° C. for 1 hour under reflux conditions. Cool. Add 262 grams of cyclophentyl bromide. Heat at 64° C. for a period of 1 hour under reflux conditions. Separate the precipitate of sodium bromide by filtration. The filtrate is reduced in volume by distillation in partial vacuum. The residue is 5-cyclopentyl, 5,5'-sodium, 4-hydro orotic acid, sodium. To this residue add 109 grams of ethyl bromide plus 100 grams of ethyl alcohol. Reflux for 1 hour at 78° C. Cool. Separate the sodium bromide from the filtrate. Remove excess ethyl alcohol from the filtrate by distillation in partial vacuum. The residue is 5-cyclopentyl, 5'-ethyl, 4-hydro orotic acid, sodium.

Example 11

Add 178 grams of the sodium salt of dihydro orotic acid to 136 grams of sodium ethylate. Heat at a temperature of 78° C. for 1 hour under reflux conditions. Cool. Add 262 grams of cyclohexenyl bromide. Heat at 64° C. for a period of 1 hour under reflux conditions. Separate the precipitate of sodium bromide by filtration. The filtrate is reduced in volume by distillation in partial vacuum. The residue is 5-cyclohexenyl, 5'''-sodium, 4-hydro orotic acid, sodium. To this residue add 109 grams of ethyl bromide plus 100 grams of ethyl alcohol. Reflux for 1 hour at 78° C. Cool. Separate the sodium bromide from the filtrate. Remove excess ethyl alcohol from the filtrate by distillation in partial vacuum. The residue is 5-cyclohexenyl, 5'-ethyl, 4-hydro orotic acid, sodium.

Example 12

To 136 grams of sodium ethylate add 178 grams of the sodium salt of dihydro orotic acid. Reflux for 1 hour at 78° C. Cool. Add 156 grams of ethyl iodide. Reflux at 68° C. for a period of 30 minutes. Separate the filtrate from the residue of sodium iodide. Add 265 grams of 2 bromopyridine. Reflux for 15 minutes at 62° C. Separate the filtrate from the residue of sodium bromide. Remove excess ethyl alcohol by distillation at lowered pressure. The residue of this reaction is 5-(2 pyridyl)-5'-ethyl, 4-hydro orotic acid, sodium.

Example 13

To 136 grams of sodium ethylate add 178 grams of sodium salt of dihydro orotic acid. Reflux at 76° C. for 1 hour. Cool. Add 156 grams of ethyl iodide. Reflux at 68° C. for one-half hour. Cool. Filter to remove the residue of sodium iodide. To the filtrate add 112 grams of thienyl chloride. Reflux for one-half hour at 70° C. Filter to remove sodium chloride. Distill under partial vacuum to remove ethyl alcohol. The reaction product is 5-(thienyl), 5'-ethyl, 4-hydro orotic acid, sodium.

In further explanation of the action of orotic acid and its derivatives and again this explanation and theory is not meant to be limiting but to be merely explanatory, it is possible to use as an intermediate product between orotic acid and the organo substituted dihydro orotic acid, the product 5,5'-dihydro, 4-bromo orotic acid. When hydrobromic acid is reacted with a compound containing a double bond it is usual for one of its bonds to be eliminated and for hydrogen to go to one of the carbon atoms and bromine to go to the other, bromine being attached to the alpha carbon atom. Thus in orotic acid the hydrogen will attach to the 5 carbon and the bromine atom to the 4 carbon position. For the same reason when hypochlorous acid is added to orotic acid chlorine will attach itself to the 5 carbon atom and hydroxyl radical (OH) to the 4 carbon atom in the ring. The usual reaction may then take place on the 5,5'-disubstitution positions of the ring.

Example 14

To 68 grams of sodium ethylate add 358 grams of 5,5'-dihydro, 4 bromo orotic acid, sodium. Warm to 78° C. for a period of 1 hour under reflux conditions. Cool. Add 109 grams of ethyl bromide to the reaction product. Filter to remove precipitated sodium bromide. Distill filtrate to remove ethyl alcohol under partial vacuum. The distillate is ethyl alcohol and the residue which may be dried is 5-ethyl, 5'-hydro, 4-bromo orotic acid, sodium.

Example 15

To 136 grams of sodium ethylate add 358 grams of 5,5'-dihydro, 4-bromo orotic acid, sodium. Warm to 78° C. for a period of 1 hour under reflux conditions. Cool. Add 218 grams of ethyl bromide to the reaction product. Filter to remove precipitated sodium bromide. Distill filtrate to remove ethyl alcohol under partial vacuum. The distillate is ethyl alcohol and the residue which may be dried is 5,5'-diethyl, 4-bromo orotic acid, sodium.

Example 16

To 358 grams of 5,5'-dihydro, 4-bromo orotic acid add 68 grams of sodium ethylate. This is refluxed at a temperature of 78° C. for 1 hour. Cool. Add 156 grams of ethyl iodide. Reflux for 1 hour at 78° C. Filter to separate the residue of sodium iodide. Extract the alcohol under partial vacuum. The product of this reaction is 5-ethyl, 5'-hydro, 4-bromo orotic acid, sodium.

Example 17

To 358 grams of 5,5'-dihydro, 4-bromo orotic acid add 136 grams of sodium ethylate. This is refluxed at a temperature of 78° C. for 1 hour. Cool. Add 312 grams of ethyl iodide. Reflux for 1 hour at 78° C. Filter to separate the residue of sodium iodide. Extract the alcohol under partial vacuum. The product of this reaction is 5,5'-diethyl, 4-bromo orotic acid, sodium.

Example 18

To 68 grams of sodium ethylate add 358 grams of 5,5'-dihydro, 4-bromo orotic acid, sodium. Reflux at 78° C. for 1 hour. Cool. Add 112 grams of chlorobenzene. Filter to separate sodium chloride. Extract alcohol from the filtrate under partial vacuum. The residue may be dried. The residue is 5-phenyl, 5'-hydro, 4-bromo orotic acid, sodium.

Example 19

To 134 grams of sodium ethylate add 358 grams of 5,5'-dihydro, 4-bromo orotic acid, sodium. Reflux at 78° C. for 1 hour. Cool. Add 224 grams of chlorobenzene. Filter to separate sodium chloride. Extract alcohol from the filtrate under partial vacuum. The residue may be dried. The residue is 5,5'-diphenyl, 4-bromo orotic acid, sodium.

Example 20

Add 358 grams 5,5'-dihydro, 4-bromo orotic acid, sodium to 136 grams of sodium ethylate. Heat at a temperature of 78° C. for 1 hour under reflux conditions. Cool. Add 262 grams of cyclo pentyl bromide. Heat at 64° C. for a period of 1 hour under reflux conditions. Separate the precipitate of sodium bromide by filtration. The filtrate is reduced by distillation in partial vacuum. The residue is 5-cyclopentyl, 5'-sodium, 4-bromo orotic acid, sodium. To this residue add 109 grams of ethyl bromide plus 100 grams of ethyl alcohol. Reflux for 1 hour at 78° C. Cool. Separate the sodium bromide from the filtrate. Remove excess ethyl alcohol from the filtrate by distillation in partial vacuum. The residue is 5-ethyl, 5'-cyclopentyl, 4-bromo orotic acid, sodium.

Example 21

Add 358 grams 5,5'-dihydro, 4-bromo orotic acid to 136 grams of sodium ethylate. Heat at a temperature of 78° C. for 1 hour under reflux conditions. Cool. Add 262 grams cyclohexenyl bromide. Heat at 64° C. for a period of 1 hour under reflux conditions. Separate the precipitate of sodium bromide by filtration. The filtrate is reduced in volume by distillation in partial vacuum. The residue is 5-cyclohexenyl, 5'-sodium, 4-bromo orotic acid, sodium. To this residue add 109 grams of ethyl bromide plus 100 grams of ethyl alcohol. Reflux for 1 hour at 78° C. Cool. Separate the sodium bromide from the filtrate. Remove excess ethyl alcohol from the filtrate by distillation in partial vacuum. The residue is 5-ethyl, 5'-cyclohexenyl, 4-bromo orotic acid, sodium.

Example 22

To 136 grams of sodium ethylate add 358 grams 5,5'-dihydro, 4-bromo orotic acid, sodium. Reflux for 1 hour at 78° C. Cool. Add 156 grams of ethyl iodide. Reflux at 68° C. for a period of 30 minutes. Separate the filtrate from the residue of sodium iodide. Add 265 grams of 2 bromopyridine. Reflux for 15 minutes at 62° C. Separate the filtrate from the residue of sodium bromide. Remove excess ethyl alcohol by distillation at lowered pressure. The residue of this reaction is 5-(2 pyridyl)-5'-ethyl, 4-bromo orotic acid, sodium.

Example 23

To 136 grams of sodium ethylate add 358 grams of 5,5'-dihydro, 4-bromo orotic acid, sodium. Reflux at 76° C. for 1 hour. Cool. Add 156 grams of ethyl iodide. Reflux at 68° C. for one-half hour. Cool. Filter to remove the residue of sodium iodide. To the filtrate add 112 grams of thienyl chloride. Reflux for one-half hour at 70° C. Filter to remove sodium chloride. Distill under partial vacuum to remove ethyl alcohol. The reaction product is 5-(thienyl), 5'-ethyl, 4-bromo orotic acid, sodium.

Example 24

Add 162 grams of 5,5'-dihydro, 4-bromo orotic acid, sodium to 136 grams of sodium ethylate. Heat at a temperature of 78° C. for 1 hour under reflux conditions. Cool. Add 478 grams of cyclopentyl bromide. Heat at 64° C. for a period of 1 hour under reflux conditions. Separate the precipitate of sodium bromide by filtration. The filtrate is reduced in volume by distillation in partial vacuum. The residue is 5 cyclopentyl, 5'-hydro, 4-bromo orotic acid, sodium. To this residue add 109 grams of ethyl bromide plus 100 grams of ethyl alcohol. Reflux for 1 hour at 78° C. Cool. Separate the sodium bromide from the filtrate. Remove excess ethyl alcohol from the filtrate by distillation in partial vacuum. The residue is 5-ethyl, 5'-cyclopentyl, 4-bromo orotic acid, sodium.

Example 25

Add 173 grams of 5,5'-dihydro, 4-hydroxy orotic acid, sodium to 136 grams of sodium ethylate. Heat at a temperature of 78° C. for 1 hour under reflux conditions. Cool. Add 495 grams of cyclohexenyl bromide. Heat at 64° C. for a period of 1 hour under reflux conditions. Separate the precipitate of sodium bromide by filtration. The filtrate is reduced in volume by distillation in partial vacuum. The residue is 5-cyclohexenyl, 5'-hydro, 4-bromo orotic acid. To this residue add 109 grams of ethyl bromide plus 100 grams of ethyl alcohol. Reflux for 1 hour at 78° C. Cool. Separate the sodium bromide from the filtrate. Remove excess ethyl alcohol from the filtrate by distillation in partial vacuum. The residue is 5-ethyl, 5'-cyclohexenyl, 4-bromo orotic acid, sodium.

Example 26

To 136 grams of sodium ethylate add 173 grams of 5,5'-dihydro, 4-hydroxyorotic acid, sodium. Reflux for 1 hour at 78° C. Cool. Add 156 grams of ethyl iodide. Reflux at 68° C. for a period of 30 minutes. Separate the filtrate from the residue of sodium iodide. Add 265 grams of 2 bromopyridine. Reflux for 15 minutes at 62° C. Separate the filtrate from the residue of sodium bromide. Remove excess ethyl alcohol by distillation at lowered pressure. The residue of this reaction is 5-(2 pyridyl)-5'-ethyl, 4-bromo orotic acid, sodium.

Example 27

To 136 grams of sodium ethylate add 173 grams of 5,5'-dihydro, 4-hydroxy orotic acid, sodium. Reflux at 76° C. for 1 hour. Cool. Add 156 grams of ethyl iodide. Reflux at 68° C. for one-half hour. Cool. Filter to remove the residue of sodium iodide. To the filtrate add 112 grams of thienyl chloride. Reflux for one-half hour at 70° C. Filter to remove sodium chloride. Distill under partial vacuum to remove ethyl alcohol. The reaction product is 5-(thienyl), 5'-ethyl, 4-bromo orotic acid, sodium.

Example 28

To 246 grams of 5,5'-dichloro, 4-hydro orotic acid, sodium add 136 grams of sodium ethylate. Reflux at 1 hour at 68° C. Cool. Add 236 grams dibromo benzene. Separate the filtrate from the residue of sodium bromide. Alcohol may be removed by distillation and partial vacuum. The final product is 5,5'-(1,2 phenyl), 4-hydro orotic acid.

Example 29

To 246 grams of 5,5'-dichloro, 4-hydroxy orotic acid add an excess (200 grams) of phenyl lithium. Reflux for 2 hours at 75° C. Remove residue of lithium chloride. The final product is 5,5'-diphenyl hydroxy orotic acid.

Example 30

To 10 grams of 5,5'-diethyl, 4-hydroxy orotic acid in ethyl alcohol add sodium amalgum. Boil the alcohol under reflux conditions to liberate nascent hydrogen and convert the 5,5'-diethyl, 4-hydroxy orotic acid to 5,5'-diethyl, 4-hydro orotic acid.

Continuing further theory by way of further explanation not limiting in any sense it should be noted that the 5,5'-diorgano substituted, 4-bromo orotic acid derivatives may be converted to the 5,5'-diorgano substituted dihydro orotic acid by means of a modified Wurtz reaction.

In accordance with the principles and examples stated above the following products may be used as starting materials for the manufacture of the compounds of the invention:

(1) 4,5-dichloro, 5-hydro orotic acid, sodium (Reference—Beilstein, vol. 25, 4th ed., pp. 245–247)
(2) Dihydro orotic acid (Reference—Beilstein, vols. 22–25, First Supplement, p. 587)
(3) 5 methyl orotic acid (Reference—Chem. Abstracts, vol. 38, p. 974)
(4) 5-bromo, 5'-chloro, 4-hydroxy hydro orotic acid (Reference—Chem. Abstracts, vol. 38, p. 974)
(5) 5,5'-dichloro, 4-hydroxy hydro orotic acid (Reference—Chem. Abstracts, vol. 38, p. 974)

What is claimed is:
1. An orotic acid derivative selected from the group consisting of compounds having the following general formula:

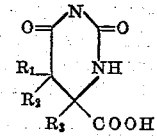

wherein $R_1$ is selected from the group consisting of phenyl, cyclopentyl, 2-pyridyl, thienyl, cyclohexenyl, and nicotinyl radicals, $R_2$ is selected from the group consisting of ethyl, phenyl, cyclopentyl, 2-pyridyl, cyclohexenyl and nicotinyl radicals and wherein $R_3$ is selected from the group consisting of hydrogen, ethyl, phenyl, bromine, and hydroxyl radicals; and sodium salts thereof.
2. 5-(2 pyridyl)-5'-ethyl-4-hydro orotic acid.
3. 5-phenyl, 5'-hydro-4-bromo orotic acid.
4. 5,5'-diphenyl-4-bromo orotic acid.
5. 5-ethyl 5'-cyclopentyl-4-bromo orotic acid.
6. 5-ethyl 5'-cyclohexenyl-4-bromo orotic acid.
7. 5-(2 pyridyl)-5'-ethyl-4-bromo orotic acid.
8. 5,5'-dinicotinyl-4-hydro orotic acid.

References Cited in the file of this patent

Mentzer et al.: Académie des Sciences, Computes Rendus, vol. 228, pp. 402–4 (1949).
Holmes et al.: Journal Biological Chemistry, vol. 206, pp. 817–23 (1954).
Beilstein, Handbuch der Organ. Chem., vol. 25, first supplement, page 587 (1936).